US011620888B2

(12) United States Patent
Mercado et al.

(10) Patent No.: US 11,620,888 B2
(45) Date of Patent: Apr. 4, 2023

(54) SYSTEM FOR DETECTING AND TRACKING AN UNAUTHORIZED PERSON

(71) Applicant: Bank of America Corporation, Charlotte, NC (US)

(72) Inventors: Daniel Mercado, Aurora, CO (US); Andrew Thomas Boyd, Charlotte, NC (US); Sanjay Arjun Lohar, Charlotte, NC (US); Michael James Sbandi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/234,409

(22) Filed: Apr. 19, 2021

(65) Prior Publication Data

US 2022/0335796 A1    Oct. 20, 2022

(51) Int. Cl.
*G08B 25/10* (2006.01)
*G08B 13/196* (2006.01)
*H04W 4/029* (2018.01)
*H04W 4/80* (2018.01)

(52) U.S. Cl.
CPC ... *G08B 13/19608* (2013.01); *G08B 13/1961* (2013.01); *G08B 13/1966* (2013.01); *G08B 25/10* (2013.01); *H04W 4/029* (2018.02); *H04W 4/80* (2018.02)

(58) Field of Classification Search
CPC ......... G08B 13/19608; G08B 13/1961; H04W 4/029; H04W 4/08
See application file for complete search history.

(56) References Cited

U.S. PATENT DOCUMENTS

| | | | |
|---|---|---|---|
| 7,353,034 B2* | 4/2008 | Haney | H04M 1/72406 455/457 |
| 10,140,820 B1 | 11/2018 | Zalewski et al. | |
| 10,880,526 B2 | 12/2020 | Fitzgibbon et al. | |
| 10,887,560 B2 | 1/2021 | Leow | |
| 10,891,839 B2 | 1/2021 | Siminoff | |
| 10,896,595 B2 | 1/2021 | Lamb et al. | |
| 10,902,104 B2 | 1/2021 | Mapen et al. | |

(Continued)

OTHER PUBLICATIONS

Mercado, D. et al., "System for Detecting Unauthorized Activity," U.S. Appl. No. 17/234,335, filed Apr. 19, 2021, 59 pages.

(Continued)

*Primary Examiner* — Chirag R Patel

(57) ABSTRACT

A system includes a plurality of sensors distributed about a space. Each sensor generates sensor data associated with properties of one or more people in the space. An automated response subsystem receives the sensor data. An unauthorized activity performed by a first person in the space is detected based on at least a portion of the received sensor data. In response to detecting the unauthorized activity, tracking instructions are transmitted that identify the first person associated with the unauthorized activity. A tracking device receives the tracking instructions. A device associated with the first person is detected. Over a period of time, the tracking device sends queries to the device and receives corresponding responses from the device. The tracking device determines positions of the device within the space over the period of time.

20 Claims, 7 Drawing Sheets

(56) References Cited

U.S. PATENT DOCUMENTS

| | | |
|---|---|---|
| 10,909,792 B2 | 2/2021 | Schoenfelder et al. |
| 10,909,825 B2 | 2/2021 | Scalisi |
| 10,915,464 B2 | 2/2021 | Chen et al. |
| 10,917,491 B1 | 2/2021 | Ogrinz et al. |
| 10,917,745 B2 | 2/2021 | Wootton et al. |
| 10,918,224 B2 | 2/2021 | Johnston et al. |
| 10,922,935 B2 | 2/2021 | Child et al. |
| 10,922,937 B2 | 2/2021 | Dumas |
| 10,922,953 B2 | 2/2021 | Faltaous et al. |
| 10,930,130 B2 | 2/2021 | Horrocks et al. |
| 10,936,746 B2 | 3/2021 | Farlow et al. |
| 10,937,282 B2 | 3/2021 | Hicks, III |
| 10,938,649 B2 | 3/2021 | Amini et al. |
| 10,938,790 B2 | 3/2021 | Brathwaite |
| 10,948,354 B2 | 3/2021 | Munir et al. |
| 10,950,119 B2 | 3/2021 | Davies et al. |
| 10,950,120 B2 | 3/2021 | Poder et al. |
| 2010/0240398 A1* | 9/2010 | Hotes .................... H04L 63/102 455/456.2 |
| 2019/0057561 A1* | 2/2019 | Zavesky .............. A61B 5/0205 |
| 2019/0311061 A1* | 10/2019 | Peterson ............. G06F 16/2477 |
| 2021/0002946 A1 | 1/2021 | Benkreira et al. |
| 2021/0005075 A1 | 1/2021 | Breed |
| 2021/0012115 A1 | 1/2021 | Bodbyl et al. |
| 2021/0012627 A1 | 1/2021 | Coles |
| 2021/0012643 A1 | 1/2021 | Olds et al. |
| 2021/0029130 A1 | 1/2021 | Kale et al. |
| 2021/0031724 A1 | 2/2021 | Hallberg et al. |
| 2021/0035392 A1 | 2/2021 | Lee et al. |
| 2021/0042804 A1 | 2/2021 | Lamberton |
| 2021/0044442 A1 | 2/2021 | Proud et al. |
| 2021/0044591 A1 | 2/2021 | Ciano et al. |
| 2021/0049280 A1 | 2/2021 | Koshy et al. |
| 2021/0056240 A1 | 2/2021 | Trim et al. |
| 2021/0056836 A1 | 2/2021 | Beale et al. |
| 2021/0075834 A1 | 3/2021 | Sabet et al. |
| 2021/0082260 A1 | 3/2021 | Coles |
| 2021/0082278 A1 | 3/2021 | Lamb et al. |
| 2021/0407266 A1* | 12/2021 | Jarvis .................... G06V 40/172 |

OTHER PUBLICATIONS

Mercado, D. et al., "Automatic Switching of Device Security Protocols Based on the Detection of an Unauthorized Event," U.S. Appl. No. 17/234,513, filed Apr. 19, 2021, 57 pages.

* cited by examiner

SYSTEM FOR DETECTING AND TRACKING AN UNAUTHORIZED PERSON

TECHNICAL FIELD

The present disclosure relates generally to synthetic media. More particularly, the present disclosure is related to a system for detecting and tracking an unauthorized person.

BACKGROUND

A conventional security system detects a security-compromising event when an individual activates an alarm or in response to the open-closed state of an access point (e.g., via the detection of a window being opened) during times when people are not authorized to access a space. For example, during a certain portion of the day, such as during the night, no people may be authorized to move about in certain spaces such as a store or other area that is publicly accessible during the day. A security system may detect the opening of an access point during a restricted time and sound an alarm. Certain devices, such as automated teller machines (ATMs) have security protocols to authenticate the identity of a person interacting with information and/or services available through the device. There exists a need for improved technology for securing such spaces and device.

SUMMARY

Previous security technology suffers from certain disadvantages. For example, previous technology generally only provides a generic alarm and fails to provide any information useful for providing a tailored response to a particular event. For example, if a person activates an alarm, little else is known other than that security personnel may be needed. As such, the responses available to the delayed and generic alerts of previous technology are generally very limited and inefficient. This can increase the risk of harm to the person or security of information effected by the event. This disclosure recognizes that it is preferable for an alert or other further response operations to be performed automatically without user intervention. For example, this may prevent a bad actor from being alerted to the response and improve the safety of people near the event. However, the automatic detection of and response to particular events is particularly challenging in complex spaces where multiple people can freely move about and interact with one another, such as in a store or other public gathering space. Previous technology lacks the ability to automatically detect a potentially security-compromising event in a space containing multiple people moving about, interacting with each other, and interacting with items and/or devices located within the space. Previous technology also lacks the ability to provide a tailored response based on the characteristics of a security-compromising event.

Certain embodiments of this disclosure provide unique solutions to technical problems of previous technology, including those described above, by providing systems which automatically detect unauthorized events or activity and provide an appropriate automatic response. For example, the disclosed system provides several technical advantages which may include: 1) automatically detecting an unauthorized event or activity in a space in which multiple people can move about and interact, such that security of individuals is improved in the space; 2) providing and/or initiating an automatic response to the detected event that is tailored to be appropriate for the type of event or activity in order to effectively improve security; 3) automatically identifying and/or tracking a bad actor indicated to be associated with a detected event or activity; and 4) dynamically updating device operation and security protocols in response to a detected event or activity to improve the security of people operating the device and the information and/or services available through the device. As such, this disclosure may improve the functioning of computer systems used to detect security-compromising or otherwise unauthorized activities and/or events, computer systems use to identify and/or tack potential bad actors, and/or computer systems used to provide secure information and/or services, such as ATM machines.

In some embodiments, the systems, methods, and devices described in this disclosure may particularly be integrated into a practical application of an automated response subsystem that uses sensor data collected in a space to characterize features of people in the space, such as features of their movements, biometric characteristics, and the like, to detect security-compromising or unauthorized event that may be occurring. Based on scores determined from the feature values, an appropriate response is automatically initiated without the need for a person to take any action that would alert a bad actor that an alarm has been raised. The automated response subsystem provides alerts that are tailored to the detected event. The automated response subsystem improves security technology used for event detection and response by matching a detected event to appropriate response activities, such as providing an alert and instructions for tracking bad actors and/or adjusting local devices to operate according to more secure protocols. As such, the automated response subsystem also improves security of people in the space through these technical improvements to security technology.

In some embodiments, the systems, methods, and devices described in this disclosure may particularly be integrated into a practical application of a tracking device. The tracking device may identify a potential bad actor in a space (e.g., based on information from the automated response subsystem or from sensor data from sensors distributed about the space). The tracking device detects the bad actor's mobile device, determines any available identifying information from the device, and communicates with the mobile device to track the position of the bad actor. The tracking device provides an improvement to previous security technology by providing additional and/or more reliable identifying information for bad actor detected in a space.

In some embodiments, the systems, methods, and devices described in this disclosure may particularly be integrated into a practical application of a service-providing device (e.g., an ATM) with adaptive security protocols (e.g., the adaptive-security device 108 of FIGS. 1 and 5). This adaptive-security device automatically adjusts its operating and/or security protocols in response to the detection of a potentially security-compromising event. For example, the device may limit or prevent access to certain information and/or services when a potentially security-compromising event is detected (e.g., by the automated response subsystem or by the device itself using sensor data from sensors distributed about the space).

Certain embodiments of this disclosure may include some, all, or none of these advantages. These advantages and other features will be more clearly understood from the following detailed description taken in conjunction with the accompanying drawings and claims.

In an embodiment, a system includes a plurality of sensors distributed about a space. Each sensor generates sensor data associated with properties of one or more people in the space. A gateway device receives the sensor data from each of the plurality of sensors and provides the sensor data to an automated response subsystem over a network. The automated response subsystem receives the sensor data. A first feature value is determined based on the received sensor data. The first feature value corresponds to an amount of change in a first property of a person in the space. An event score is determined based on the first feature value. The event score corresponds to a probability that an actionable event occurred within the space. The event score is compared to predefined response criteria. Based on the comparison of the event score to the predefined response criteria, an actionable event is detected, and an automated response to initiate for the detected actionable event is identified. One or both of an alert and instructions are provided in order to initiate the automated response.

In another embodiment, a system includes a plurality of sensors distributed about a space. Each sensor generates sensor data associated with properties of one or more people in the space. An automated response subsystem receives the sensor data. An unauthorized activity performed by a first person in the space is detected based on at least a portion of the received sensor data. In response to detecting the unauthorized activity, tracking instructions are transmitted that identify the first person associated with the unauthorized activity. A tracking device receives the tracking instructions. A device associated with the first person is detected. Over a period of time, the tracking device sends queries to the device and receives corresponding responses from the device. The tracking device determines, based on the sent queries and the received responses from the device, positions of the device within the space over the period of time. The tracking device generates a report that includes the determined positions of the device and provide the report to a security entity.

In yet another embodiment, a system includes a plurality of sensors distributed about a space. Each sensor generates sensor data associated with properties of one or more people in the space. An automated response subsystem receives the sensor data. An unauthorized event is detected associated with an adaptive-security device operating within the space. In response to detecting the unauthorized event, operating instructions are transmitted that identify security protocols to increase security of devices during the unauthorized event. An adaptive-security device operates within the space. Prior to receiving the operating instructions, the adaptive-security device receives user credential and determines, based on the received credentials, a user is authenticated based on the received user authentication. After determining the user is authenticated, secure information is presented on a display of the adaptive-security device. The adaptive-security device receives the operating instructions. After receiving the operating instructions, the adaptive-security device determines whether a user is currently accessing secure information in the adaptive-security device. If the user is currently accessing the secure information, display of at least a portion of the secure information is prevented. If the user is not currently accessing the secure information, authentication requirements are increased for accessing the secure information.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
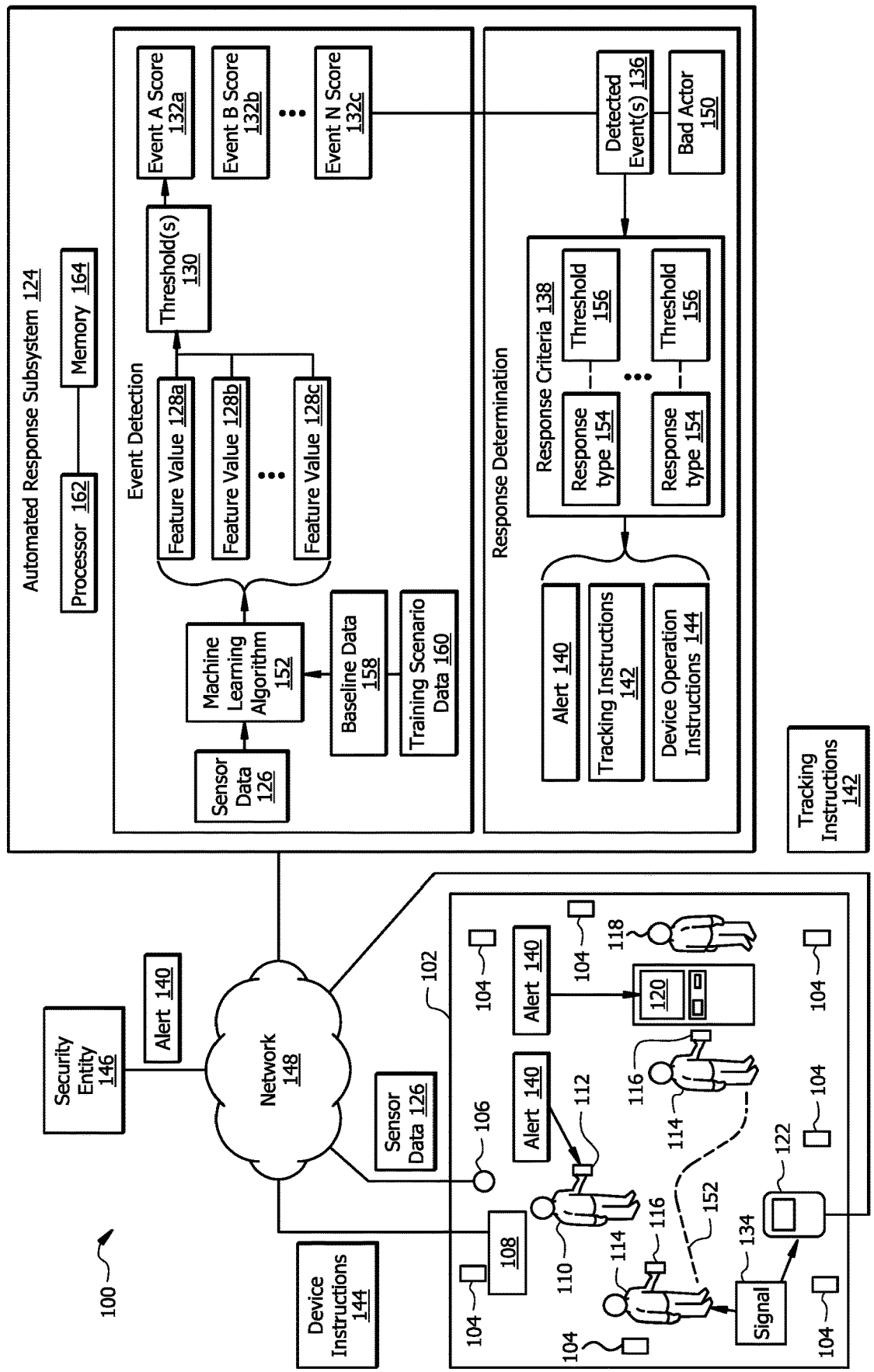
FIG. 1 is a schematic diagram of an example system configured for automatic event detection and response.

As described above, prior to this disclosure, there was a lack of tools for automatically detecting and appropriately responding to security- and/or health-compromising or otherwise unauthorized events or activities in a space. This disclosure provides a number of technical solutions to the technical problems of previous technology. For example, this disclosure provides an automated response subsystem that uses sensor data obtained from sensors distributed in a space to detect potentially security compromising events without relying on an alarm from a person or an opened access point (which is not a relevant indicator of compromised security for many common circumstances, such as when people are allowed to move about in a space). The automated response subsystem then determines an appropriate response for the detected event and initiates the response. As such, the automated response subsystem not only improves the detection of security-compromising events compared to previous technology but also provides tailored responses that are automatically in response to the detected event, thereby improving security technology. This disclosure also provides an automated tracking device which detects a bad actor associated with a detected security-compromising event and tracks the location of the bad actor using information from the bad actor's mobile device. This disclosure also provides an adaptive-security device that adjusts its security protocols based on a detected security-compromising event such that secure services and/or information are protected during the event. The automated response subsystem, tracking device, and adaptive-security device may be operated alone or in any combination to achieve technical improvements over previous technology.
System for Automatic Event Detection and Response FIG. 1 is a schematic diagram of an example system 100 for improving the security within a space 102. The system 100 includes a physical space 102, a plurality of sensors 104, a communications gateway device 106, an adaptive-security device 108, a computing device 120, a tracking device 122, an automated response subsystem 124, a security entity 146, and a network 148.

The physical space 102 may be any physical space, such as a store, data storage room, or other area accessible to a number of people 110, 114, 118. In the example of FIG. 1, the space 102 is an enclosed area in which people 110, 114, 120 can move about and interact with each other and with adaptive-security device 108. The sensors 104 are distributed about the space (e.g., located on the walls, ceiling, and/or floor of the space 102). In the example of FIG. 1, the space 102 includes the communications gateway 106, the adaptive-security device 108, the computing device 120, and the tracking device 122. However, in other embodiments, one or more of these components may be absent or additional components may be present.

The plurality of sensors 104 include any sensors operable to detect characteristics of people 110, 114, 118 moving about the space 102. The sensors 104 may include sound sensors (e.g., microphones tuned to any appropriate frequency range), infrared sensors, cameras, depth sensors, ultrasonic sensors, motion detectors, and the like. The sensors 104 may be any sensors operable to detect a movement, acceleration, posture, height, and/or one or more biometric features of the people 110, 114, 118 in the space 102. The detected biometric features may include a vital signs, biometric characteristics, or the like. Sensors 104 are distributed about the space 102 in any appropriate configuration. For example, the sensors may be attached to or embedded in the ceiling, walls, and/or floor of the space 102. Sensors may be coupled to furniture (e.g., shelves, tables, etc.) in the space 102 and/or connected to devices 108, 120, 122. An example sensor 104 is described in greater detail below with respect to FIG. 7.

The sensors 104 are generally operable to generate sensor data 126 that indicates the properties of the space 102 (e.g., an amount of movement in the space 102, a number of people present in the space 102, etc.) and/or the people 110, 114, 118 in the space 102 (e.g., movement speed, acceleration, posture, height, and/or biometric features of the people 110, 114, 118). The sensors 104 may communicate sensor data 126 to the communications gateway 106 and/or directly over the network 148. In some embodiments, one or more sensors 104 may be embedded or communicatively coupled to the adaptive-security device 108 and/or the tracking device 122. For instance, one or more sensors 104 may be located on, in, or around the adaptive-security device 108 to detect potential security-compromising events 136 associated with the use of the adaptive-security device 108 (e.g., a person 114 compromising security of information and/or services provided by the adaptive-security device 108 and/or a person 110 operating the adaptive-security device 108).

The communications gateway device 106 is generally a device operable to allow communication of sensor data 126 collected from the sensors 104 over network 148 to the automated response subsystem 124. For example, the communications gateway 106 may connect the sensors 104 to a local area network operated at the space 102 to connect the various devices 108, 120, 122 and/or the sensors 104 to network 148. The communications gateway 106 may communicate with the other components in the space 102 via wired or wireless connection. The communications gateway 106 may provide sensor data 126 to the tracking device 122 and/or the adaptive-security device 108. The communications gateway 106 may be implemented using the processor, memory, and interface of the device 800 described with respect to FIG. 8 below.

The adaptive-security device 108 is any computing device or collection of computing devices operable to display information (e.g., protected or secure information) and/or provide services. For example, in certain embodiments, the adaptive-security device 108 is an ATM machine. In other embodiments, the adaptive-security device 108 is a computing device storing secure information (e.g., such as in a data room or the like). The adaptive-security device 108 may include one or more of the sensors 104 described above. The adaptive-security device 108 may be communicatively coupled to the sensors 104 to receive sensor data 126. In general, the adaptive-security device 108 is configured to adjust its authentication protocols and/or the amount or type of information and/or services accessible through the device in response to a detected event 136. Further details and examples of the operation of the adaptive-security device 108 and its hardware components are provided below with respect to FIGS. 5 and 6.

In some embodiments, the automated response subsystem 124 detects an event 136 (e.g., related to compromised security in the space 102) and provides device operation instructions 144 to adjust operation of the adaptive-security device 108. For example, the adaptive-security device 108 may be communicatively coupled to the network 148 to receive device operation instructions 144 that are determined by the automated response subsystem 124. In some embodiments, the adaptive-security device 108 itself may perform at least a portion of the functions of the automated response subsystem 124 (described further below and with respect to FIG. 2) in order to determine the device operation instructions 144 and adjust operation of the adaptive-security device 108 in response to a detected event 136.

The computing device 120 is generally any computing device, such as a computer, that is operated in space 102 by certain authorized users. For example, if the space 102 is a store, computing device 120 may be a kiosk or cash register operated by person 118 who may be an employee of the store (e.g., an individual with authorization, via appropriate login credentials or the like, to use computing device 120). As described further below and with respect to FIG. 2, one or more alerts 140 generated by the automated response subsystem 124 may be provided for presentation on the computing device 120. For example, an alert 140 may notify authorized person 118 of a detected event 136 in the space 102. The computing device 120 may be implemented using the processor, memory, interface, and display of the device 800 described with respect to FIG. 8 below.

The tracking device 122 is generally any device operable to track a physical position 152 of the device 116 of the person 114 indicated as a potential bad actor 150. In the example of FIG. 1, the bad actor 150 is person 114. The tracking device 122 may send and receive communication signals 134 with the device 116 of the person 114 identified as the bad actor 150 in order to identify the bad actor 150 and/or track a position 152 of the bad actor 150 in the space. In some embodiments, the automated response subsystem 124 detects an event 136 (e.g., related to compromised security in the space 102) and provides tracking instructions 142 to identify and/or track the bad actor 150. For example, the tracking device 122 may be communicatively coupled to the network 148 to receive tracking instructions 142 that are determined by the automated response subsystem 124. In some embodiments, the tracking device 122 itself may perform at least a portion of the functions of the automated response subsystem 124 (described further below and with respect to FIG. 2) in order to determine the tracking instructions 142. Further details and examples of the operation of the tracking device 122 and its hardware components are provided below with respect to FIGS. 3 and 4.

The automated response subsystem 124 may be a device or collection of devices (e.g., implemented as a server) operable to detect a security- or health-compromising event 136 and provide an automatic response tailored to the detected event 136. The event 136 may correspond to an unauthorized activity, such that detection of an event 136 is the same as detecting an unauthorized activity performed in the space 102. Further details and examples of the operation of automated response subsystem 124 are provided below with respect to FIG. 2. The automated response subsystem 124 includes a processor 162 and a memory 164. The memory 164 includes any logic, instructions, code, and/or rules for implementing the functions of the automated response subsystem 124 using the processor 162.

The processor 162 comprises one or more processors. The processor 162 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 162 may be a programmable logic device, a microcontroller, a microprocessor, or any suitable combination of the preceding. The processor 162 is communicatively coupled to and in signal communication with the memory 164. The one or more processors are configured to process data and may be implemented in hardware and/or software. For example, the processor 162 may be 8-bit, 16-bit, 32-bit, 64-bit or of any other suitable architecture. The processor 162 may include an arithmetic logic unit (ALU) for performing arithmetic and logic operations, processor registers that supply operands to the ALU and store the results of ALU operations, and a control unit that fetches instructions from memory 164 and executes them by directing the coordinated operations of the ALU, registers and other components. In an embodiment, the function of the automated response subsystem 124 described herein is implemented using logic units, FPGAs, ASICs, DSPs, or any other suitable hardware or electronic circuitry.

The memory 164 is operable to store any data, instructions, logic, rules, or code operable to execute the functions of the automated response subsystem 124. The memory 164 comprises one or more disks, tape drives, or solid-state drives, and may be used as an over-flow data storage device, to store programs when such programs are selected for execution, and to store instructions and data that are read during program execution. The memory 164 may be volatile or non-volatile and may comprise read-only memory (ROM), random-access memory (RAM), ternary content-addressable memory (TCAM), dynamic random-access memory (DRAM), and static random-access memory (SRAM).

The automated response subsystem 124 generally uses sensor data 126 from the sensors 104 in the space 102 to detect an event 136 and determines an appropriate tailored response (e.g., sending an alert 140 and/or instructions 142, 144) for the detected event 136. To accomplish this, the automated response subsystem 124 determines feature values 128a-c using the sensor data 126. The feature values 128a-c may be a measure of (or a measure of a change in) a property of persons 110, 114, 118 in the space 102 (e.g., a change from an initial or baseline property). For example, feature values 128a-c may correspond to movement speed of a person 110, 114, 118, acceleration of a person 110, 114, 118, posture of a person 110, 114, 118, presented height of a person 110, 114, 118, vital signs of a person 110, 114, 118, biometric characteristics of a person 110, 114, 118, or changes in these properties. In some embodiments, at least certain feature values 128a-c do not correspond to a specific observable property of a person 110, 114, 118 or the space 102. Instead, one or more feature values 128a-c may be quantitative values determined using a machine learning or artificial intelligence algorithm 152 that is trained to detect particular event types (e.g., associated with compromised safety and/or health of people 110, 114, 118 in the space 102). The algorithm may be developed by training the automated response subsystem 124 during an initial period when people 110, 114, 118 in the space 102 are actors behaving in a predefined manner associated with expected 'normal' events in the space 102 using the baseline data 158. The baseline data 158 includes sensor data 126 collected during this initial training time. One or more test scenarios may then be performed in the space 102 in which the people 110, 114, 118 behave in a manner to simulate possible events 136, such as by moving rapidly, lying on the floor, falling down, or the like to generate test scenario data 160. The test scenario data 160 may also be used to train the machine learning algorithm 152 to determine feature values 128a-c that are most relevant to determining detected events 136. The training scenario data 160 includes sensor data 126 collected when one or more training scenarios are in progress. Any number of feature values 128a-c may be determined as appropriate for a given application.

The feature values 128a-c are compared, individually or in any appropriate combination, to threshold values 130 in order to determine event scores 132a-c. Each event score 132a-c corresponds to a probability that a given event type has occurred. For example, a first event score 132a may correspond to the probability that a security-compromising event occurred (e.g., if a person 110, 114, 118 behaves erratically by moving or accelerating rapidly, if the biometric characteristics of the person 110, 114, 118 suddenly change, or the like). Meanwhile, a second event score 132b may correspond to the probability that a health event 136 has occurred (e.g., if a person 110, 114, 118 falls to the ground, has a change in biometric characteristics, or the like). The event scores 132a-c are used to determine one or more detected events 136. For example, an event 136 for a given event score 132a-c may be detected if the event score 132a-c is greater than a threshold value (e.g., a threshold 130 and/or 156)). In some cases, an event 136 may be detected using a combination of two or more of the event scores 132a-c. For example, a machine learning algorithm 152 may be trained using the baseline data 158 and training scenario data 160, as described above, to determine detected events 136 based on a combination of multiple event scores 132a-c.

The automated response subsystem 124 then determines if the event scores 132a-c (e.g., used to arrive at the detected event 136) satisfy response criteria 138 for initiating an automatic response, for example, by providing an alert 140, generating and providing tracking instructions 142 to the tracking device 122, and/or generating and providing device operation instructions 144 to the adaptive-security device 108. The response criteria 138 may be stored in the memory 162 of the automated response subsystem 124. The response criteria 138 may include, for each known response type 154 (e.g., related to responding appropriately to different security and/or health compromising situations), a corresponding threshold value 156 for one or more of the event scores 132a-c. The response criteria 138 may require that at least one event score 132a-c is greater than a threshold value 156 for a corresponding response type 154. In some embodiments, the response criteria 138 may require that two or more event scores 132a-c are greater than a threshold value 156 for a response type 154. The response criteria 138 may include, for each known response type 154 (e.g., related to responding appropriately to different security and/or health compromising situations), a corresponding threshold value 156 for one or more of the event scores 132a-c. In some cases, in order for a given response criteria 138 to be satisfied, each of the thresholds 156 for a given response type 154 must be met.

A range of responses may be automatically initiated by the automated response subsystem 124, as illustrated by the various examples of this disclosure. For instance, if the event scores 132a-c satisfy response criteria 138 for a high-level response, the automated response subsystem 124 may generate an alert 140 requesting ais from a security entity 146 (e.g., if security or health-provider personnel should be requested in response to the detected event 136). The alert 140 is then provided to the security entity 146. As another example, an alert 140 may be sent to a mobile device 112 of person 110 or the device 120 operated by person 118 if appropriate response criteria 138 are satisfied, as described with respect to the examples below. In some embodiments, a particular person (e.g., person 114) may be determined as a potential bad actor 150 associated with the detected event 136, and the automated response subsystem 124 may generate tracking instructions 142 for tracking the bad actor (e.g., moving along positions 152 illustrated in FIG. 1). In some embodiments, the detected event 136 is determined to be associated with (e.g., within a threshold distance of) an adaptive-security device 108, and the automated response subsystem 124 may generate device operation instructions 144 for improving the security of information and/or services provided by the adaptive-security device 108.

As further examples, in some cases, the first feature value 128a corresponds to a measure of a rate of movement of person 114. The automated response subsystem 124 determines an event score 132a by comparing the rate of movement (feature value 128a) to a threshold movement speed included in thresholds 130 and determining that the rate of movement is greater than the threshold movement speed by an amount. The determined event score 132a may be determined based on the amount that the rate of movement is greater than the threshold movement speed (e.g., the event score 132a may be proportional the amount that the movement speed feature value 128a exceeds the threshold movement speed value 130). As another example, another feature value 128b may correspond to an amount of change in the biometric characteristics of another person interacting 110, 118 that is interacting with person 114. For example, another person 110, 118 may be determined to be interacting with person 114 if the other person 110, 118 is within a threshold distance of person 114 and/or is facing person 114. Another event score 132b may be determined based on both feature value 128a and 128b. For example, the automated response subsystem 124 may determine a feature value 128b corresponding to a change in the biometric characteristics of the other person 110 118 during an interaction with person 114 and determine that the change in biometric feature value 128b is greater than a threshold value 130 by a given amount. The event score 132b may be determined based on the amount that the change in biometric feature value 128b is greater than the threshold value.

The security entity 146 may be an entity tasked with responding to at least a certain subset of detected events 136. Examples of security entity 146 include a police office, a fire department, an emergency response unit, or the like. The security entity 146 may be in communication with the automated response subsystem 124 (e.g., via network 148) to receive alerts 140. Alerts 140 sent to the security entity 146 may include a request for some action, such as for security and/or health-related response personnel to travel to the space 102. An alert 140 may include an indication of the type of the detected event 136, such that an appropriate response can be more efficiently provided by the security entity 146 than was possible using previous technology that provided only a generic alarm. For example, alert 140 may (1) indicate the person 114 identified as the bad actor 150 (e.g., a report 330 may be provided with the alert 140, as described further below with respect to FIGS. 3 and 4), (2) identify a location (e.g., tracked position 318 of FIG. 3) associated with the detected event 136, (3) identify persons 110, 118 impacted by the detected event 136, and combinations of these.

The network 148 facilitates communication between and amongst the various components of the system 100. This disclosure contemplates network 148 being any suitable network operable to facilitate communication between the components of the system 100. Network 148 may include any interconnecting system capable of transmitting audio, video, signals, data, messages, or any combination of the preceding. Network 148 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100, the system 100 detects and responds to a potential security-compromising event 136. In this example, person 114 enters the space 102 and behaves in a manner associated with a potential security-compromising event 136. The sensors 104 provide sensor data 126 to the automated response subsystem 124. The automated response subsystem 124 uses the sensor data 126 to determine feature values 128a-c associated with the person 114 in the space 102. For example, a first feature value 128a may be a rate of movement (or a change in the rate of movement) of the person 114, a second feature value 128b may be a biometric characteristic (or a change in a biometric characteristic) of the person 114, and a third feature value 128c may be a presented height or posture (or a change in this height or posture) of the person 114. Event scores 132a-c may be determined by comparing the feature values 128a-c to thresholds 130. If a feature value 128a-c is greater than a threshold value 130, the probability that a particular event is occurring (i.e., an event score 132a-c) may be increased. For example, if the person 114 suddenly begins running, moving rapidly, or moving according to certain patterns in the space 102, the person 114 may be more likely to be taking part in a security-compromising activity (or fleeing from one). The biometric characteristic (s) of the person 114 may similarly be indicative of the occurrence of a security-compromising event 136. The automated response subsystem 124 then determines if event scores 132a-c indicate that a security-compromising event 136 is detected.

One or more response may be automatically initiated in response to this example security-compromising event 136, as described in the following. As an example, an alert 140 may be generated and provided to the security entity 146 to request a security response to the event 136. As such, security in space 102 can be improved by alerting security entity 146 to the event 136 without requiring a person 110 or 118 to take any action (e.g., sounding an alarm) which might be recognized by the potential bad actor 150. As another example response to this example security-compromising event 136, the automated response subsystem 124 may send alert 140 to person 110 to check on the security state or wellness of the person 110 or the space 102. For example, the alert 140 may instruct person 110 and/or 118 to evacuate the space 102.

As yet another example response to this example security-compromising event 136, the automated response subsystem 124 may generate tracking instructions 142 indicating the bad actor 150 who should be tracked by the tracking device 122. For example, the tracking instructions 142 may indicate an initial position of the bad actor 150 (see FIG. 3). The tracking device 122 may receive these tracking instructions 142 and use them to detect a mobile device 116 operated by the potential bad actor 150, who is person 114 in this illustrative example. The tracking device 122 may send and receive communications 134 from the mobile device 116 to track a physical position 152 of the person 114 in the space 102. Further details and examples of tracking a person, such as person 114, are described below with respect to FIGS. 3 and 4.

As a further example response to this example security-compromising event 136, the automated response subsystem 124 may generate device operation instructions 144 for adjusting the information and/or services provided by the adaptive-security device 108. For example, if the detected event 136 is determined to be associated with (e.g., within a threshold distance of) the adaptive-security device 108, the automated response subsystem 124 may determine that operation of device 108 should be adjusted for improved security. The device operation instructions 144 may cause the adaptive-security device 108 to require increased authentication credentials (e.g., multi-factor authentication), may prevent display of certain information, and/or may reduce or eliminate services provided by the adaptive-security device 108. For example, if the adaptive-security device 108 is an ATM machine, the device operating instructions 144 may (1) require users to provide a multi-factor authentication to access account information, (2) prevent display of account balances, and/or (3) prevent or limit the amount of funds that can be withdrawn from the ATM machine. Further details and examples of adjusting operation of the adaptive-security device 108 are described below with respect to FIGS. 5 and 6.

In another example operation of the system 100, the system 100 detects and responds to a potential health-compromising event 136. In this example, person 110 is undergoing a health-compromising event 136 in the space 102 (e.g., undergoing cardia arrest). Feature values 128*a*-*c* for the person 110 determined from sensor data 126 may be indicative of such a health event. For example, feature values 128*a*-*c* associated with biometric characteristics and other vital signs may be indicative of compromised health of the person 114. Similarly, feature values 128*a*-*c* associated with the posture or the presented height of the person 114 may indicate the person 110 has fallen to the floor (e.g., if the presented height of person 114 suddenly decreases).

One or more response may be automatically initiated in response to this example health-compromising event 136, as described in the following. As an example response, an alert 140 may be generated and provided to the security entity 146 to request health-related services. As such, security of person 110 in space 102 can be improved by alerting security entity 146 to the event 136 without requiring the person 114 to provide any communication or another person 114, 118 to notice and respond to the health-compromising event 136. As another example response to this example health-compromising event 136, the automated response subsystem 124 may send alert 140 to person 110 to check on the person's health and/or an alert 140 to the device 120 operated by person 118 to inform the local person 118 of the event 136, such that action may be taken immediately if possible/appropriate.

In yet another example operation of the system 100, the system 100 detects and responds to another potential security-compromising event 136. In this example, the event 136 is detected based on feature values 128*a*-*c* of a person 110, 118 on which the event may be being perpetrated (e.g., by person 114). For example, the automated response subsystem 124 may determine that feature values 128*a*-*c* associated with distress or discomfort of a person 110, 118 increase above a threshold value 130 when the person 110, 118 interacts with person 114 in the space 102. For example, the automated response subsystem 124 may determine that the biometric characteristic(s) or vital sign quantity of a person 110, 118 increases above a threshold value 130 when the person 110, 118 interacts with person 114. A machine learning algorithm 152 may be trained (e.g., using baseline data 158 and training scenario data 160 as described above) to determine feature values 128*a*-*c* indicative of compromised safety. Once the security-compromising event 136 is detected, the same or similar responses may be automatically implemented, as described above with respect to the other example security-compromising event 136 (e.g., by providing alert(s) 140, tracking instructions 142 to track person 114, and/or device operation instructions 144 to improve security of device 108).

Example Method of Automatic Event Detection and Response

Figure 2:
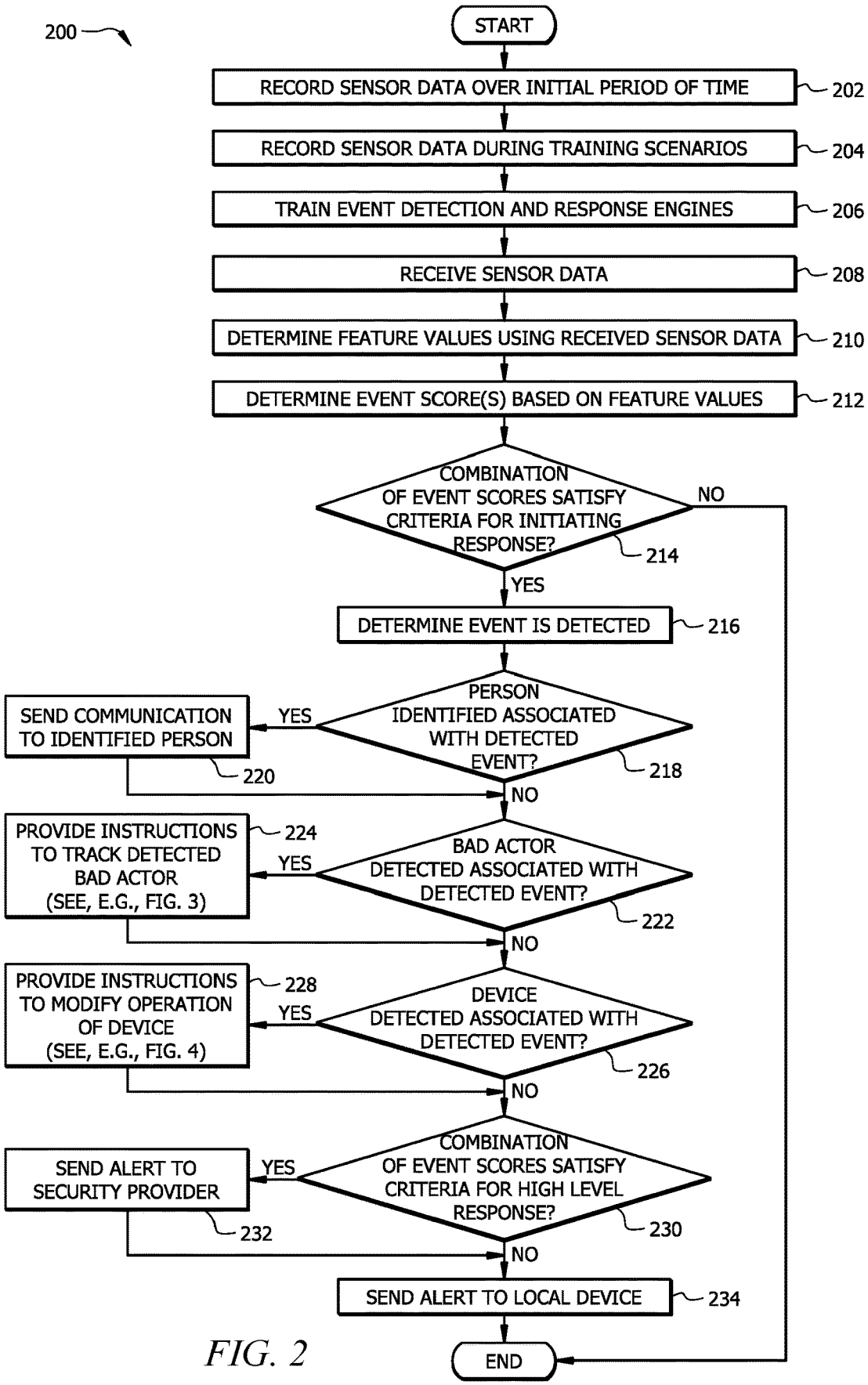
FIG. 2 is a flowchart illustrating an example method of operating the automated response subsystem of the system of FIG. 1.

FIG. 2 is a flowchart of an example method 200 for operating the automated response subsystem 124 of FIG. 1. The method 200 improves security technology used for event detection and response determined, for a detected event 136, an appropriately tailored response, such as providing an alert 140 and instructions 142, 144 for tracking bad actor 150 and/or adjusting local device 108 operation to improve security of information, services, and individuals. These technical improvements facilitate increased safety of information, services, and people 110, 114, 118 in the space 102.

The method 200 may begin with initial steps 202-206 during which the automated response subsystem 124 is trained for event detection and response determination 136. The method 200 may be performed by the automated response subsystem 124 (e.g., by the processor 162 of the automated response subsystem 124). For example, at step 202 sensor data 126 may be received during an initial period of time. During the initial period of time, people 110, 114, 118 in the space 102 may be behaving in a predefined manner associated with expected 'normal' events in the space 102 (e.g., to determine baseline data 158). During another period of time, the automated response subsystem 124 may record sensor data 126 during one or more test or training scenarios at step 204 (e.g., to determine testing scenario data 160). During the test or training scenarios, the people 110, 114, 118 behave in a manner to simulate possible events 136 (e.g., by moving rapidly, lying on the floor, falling down, etc.), such as security-compromising events, health-compromising events, and the like. At step 206, the automated response subsystem 124 is trained using the sensor data 126 from 'normal' scenarios from step 202 and for simulated events from step 204. For example, a machine learning algorithm 152 of the automated response subsystem 124 may be trained to determine feature values 128*a*-*c* (e.g., whether a value corresponding to a particular measure, such as movement speed, biometric characteristics, or the like or a value established through training of a machine learning algorithm 152 to identify events 136) appropriate for determining a detected event 136.

At step 208, the automated response subsystem 124 receives sensor data 126 from one or more sensors 104 distributed about the space 102. As described above with respect to FIG. 1, the sensor data 126 may include any information collected by the sensors 104 distributed about the space 102. The sensor data 126 may be indicative of properties of the space 102 (e.g., an amount of movement in the space 102 a number of people present in the space 102, etc.) and/or the people 110, 114, 118 in the space 102 (e.g., movement, acceleration, posture, height, and/or biometric features of the people 110, 114, 118).

At step 210, the automated response subsystem 124 determines feature values 128a-c using the sensor data 126. The feature values 128a-c may be measures of characteristics of people 110, 114, 118 in the space 102 (e.g., their movement speed, biometric characteristics, etc.) or may be identified by training at step 206 to detect events 136. For example, a first feature value 128a may be a rate of movement (or a change in the rate of movement) of the person 110, 114, 118, a second feature value 128b may be a biometric characteristic (or a change in biometric characteristic) of the person 110, 114, 118, and a third feature value 128c may be a vital sign quantity (or a change in the vital sign quantity) of the person 110, 114, 118.

At step 212, the automated response subsystem 124 determines event scores 132a-c using the features values 128a-c. Each event score 132a-c corresponds to a probability that a given event type has occurred. For example, a first event score 132a may correspond to the probability that a security-compromising event occurred (e.g., if a person 110, 114, 118 behaves erratically by moving or accelerating rapidly, if the biometric characteristic or vital sign quantity of the person 110, 114, 118 suddenly changes, if the biometric characteristic of others interacting with the person 110, 114, 118 suddenly changes, or the like). Meanwhile, a second event score 132b may correspond to the probability that a health-related event 136 has occurred (e.g., if a person 110, 114, 118 falls to the ground, has an increased biometric characteristic, or the like). In some cases, an event score 132a-c may be determined using a machine learning algorithm 152 (e.g., trained according to steps 202-206). In some embodiments, the automated response subsystem 124 may employ a machine learning algorithm 152 (e.g., trained according to steps 202-206) to determine the feature scores 128a-c and event scores 132a-c in a single step. For example, the automated response subsystem 124 may execute a machine learning algorithm 152 that determines features values 128a-c and/or event scores 132a-c as an output using the sensor data 126 as an input.

At step 214, the automated response subsystem 124 determines whether any combination of one or more event scores 132a-c satisfies response criteria 138 for initiating an automatic response. If no response criteria 138 is satisfied, the method 200 may end (e.g., because no event 136 is detected). However, if at least one response criteria 138 is satisfied, the automated response subsystem 124 may proceed to step 216 and determine that an event 136 is detected.

At step 218, the automated response subsystem 124 determines whether a particular individual (e.g., one of people 110, 114, 118 of FIG. 1) is associated with the detected event 136. For example, if person 110 is suspected of being impacted by a security-compromising event 136 or a health-compromising event 136, the automated response subsystem 124 may determine that person 110 is associated with the detected event 136. For example, if a person 110, 114, 118 is within a threshold distance at which the event 136 is determined to have occurred in the space 102, the automated response subsystem 124 may determine that the person 110, 114, 118 is associated with the detected event 136. If a person 110, 114, 118 is determined to be is associated with the detected event 136, the automated response subsystem 124 may proceed to step 220 and provide an alert 140 to the person 110, 114, 118. For example, an alert 140 provided to the person 110, 114, 118 (e.g., to a device 112, 116, 120 operated by the person 110, 114, 118) may indicate that a possible event 136 has been detected, provide instructions for exiting the space 102, and/or provide a request to confirm whether the health and/or safety of the person 110, 114, 118 is satisfactory.

At step 222, the automated response subsystem 124 determines whether a bad actor 150 is detected associated with the event 136. For example, the automated response subsystem 124 may determine that the feature values 128a-c and/or event scores 132a-c indicate that a particular person 110, 114, 118 has performed or is performing an unauthorized or security-comprising activity. For instance, as described with respect to the examples above, if the rate of movement and/or biometric characteristic of person 114 increases suddenly in the space 102 and a security-compromising event 136 is detected (at step 216), person 114 may be identified as the bad actor 150 for the event 136. As another example, if other people 110, 118 display a characteristic response when near person 114 (e.g., move in order to evade person 114, display increased or changed biometric characteristic or vital sign quantity in the presence of person 114), the automated response subsystem 124 may identify the person 114 as the bad actor 150. If a bad actor 150 is identified at step 222, the automated response subsystem 124 may proceed to step 224 and provide tracking instructions 142 for identifying and/or tracking the bad actor 150. The tracking instructions 142 generally include a position 152 of the bad actor 150 in the space 102 (e.g., initial position 312 of FIG. 3) and characteristics of the bad actor 150, such as physical characteristics, biometric characteristics, or any other characteristics measurable by sensors 104 (e.g., event properties 314 of FIG. 3). The tracking instructions 142 generally provide information needed to identify the device 116 of the person 114 corresponding to the bad actor 150, such that further identification and/or tracking actions may be performed (see FIGS. 3 and 4 and corresponding description below). A tracking device 122 may use the tracking instructions 142 to identify and/or track the bad actor 150, as described in the examples above and with respect to FIGS. 3 and 4 below. In some embodiments, the automated response subsystem 124 may perform one or more of the functions of the tracking device 122 (e.g., such that one or more steps of method 400 of FIG. 4 may be performed by the automated response subsystem 124).

At step 226, the automated response subsystem 124 determines whether a service-providing device 108 that is configured for adaptive security operation is associated with the detected event 136 from step 216. For example, the automated response subsystem 124 may determine that the feature values 128a-c and/or event scores 132a-c indicate that the adaptive-security device 108 of FIG. 1 is associated with the detected event 136. For instance, as described with respect to the examples above, if the detected event 136 is detected within a threshold distance of the adaptive-security device 108, the automated response subsystem 124 may determine that the service-providing device 108 is associated with the detected event 136. As another example, if the detected event 136 is determined from sensor data 126 from a sensor 104 located on or near the adaptive-security device 108, the automated response subsystem 124 may determine that the service-providing device 108 is associated with the detected event 136. If this criteria of step 226 is satisfied, the automated response subsystem 124 proceeds to step 228 to provide device operation instructions 144 to the adaptive-security device 108. The adaptive-security device 108 may use the device operation instructions 144 to adjust operation of the adaptive-security device 108 to provide improved security of a person 110 operating the adaptive-security device 108, information presented by the adaptive-security device 108, and/or services provided by the adaptive-security device 108, as described in the examples above and with respect to FIGS. 5 and 6 below.

At step 230, the automated response subsystem 124 determines whether the combination of event scores 132a-c determined at step 212 satisfy response criteria 138 for initiating a "high level" response. For example, if the event scores 132a-c indicate that there is a greater than a threshold 156 probability that the security and/or health of a person 110, 114, 118 in the space 108 is compromised, the automated response subsystem 124 may determine that the high level response criteria 138 are satisfied. If the criteria 138 of step 230 are satisfied, the automated response subsystem 124 proceeds to step 232 and provides an alert 140 to the security entity 146. The alert 140 may include an indication of characteristics of the detected event 136, including, for example, a suspected type of security and/or health event 136, a possible identity, age, and/or other properties of persons 110, 114, 118 involved in the event 136. As such, the alert 140 may include information that could not be obtained using previous security systems, thereby improving security technology used to secure information, services, and the people 110, 114, 118 within the space 102.

If the criteria 138 of step 230 are not satisfied, an alert 140 may instead be provided locally, such as to the device 120 operated within the space 102. Alert 140 may inform an authorized person 118 (e.g., an employee working in the space 102, a local security agent, or the like) about the possible lower level detected event 136. This allows the person 118 to investigate and provide any appropriate action (s). As such, the automated response subsystem 124 and method 200 may also prevent "false alarm" type alerts from being provided to the security entity 146, thereby providing a further improvement to security technology.

Example Operation of a Tracking Device

Figure 3:
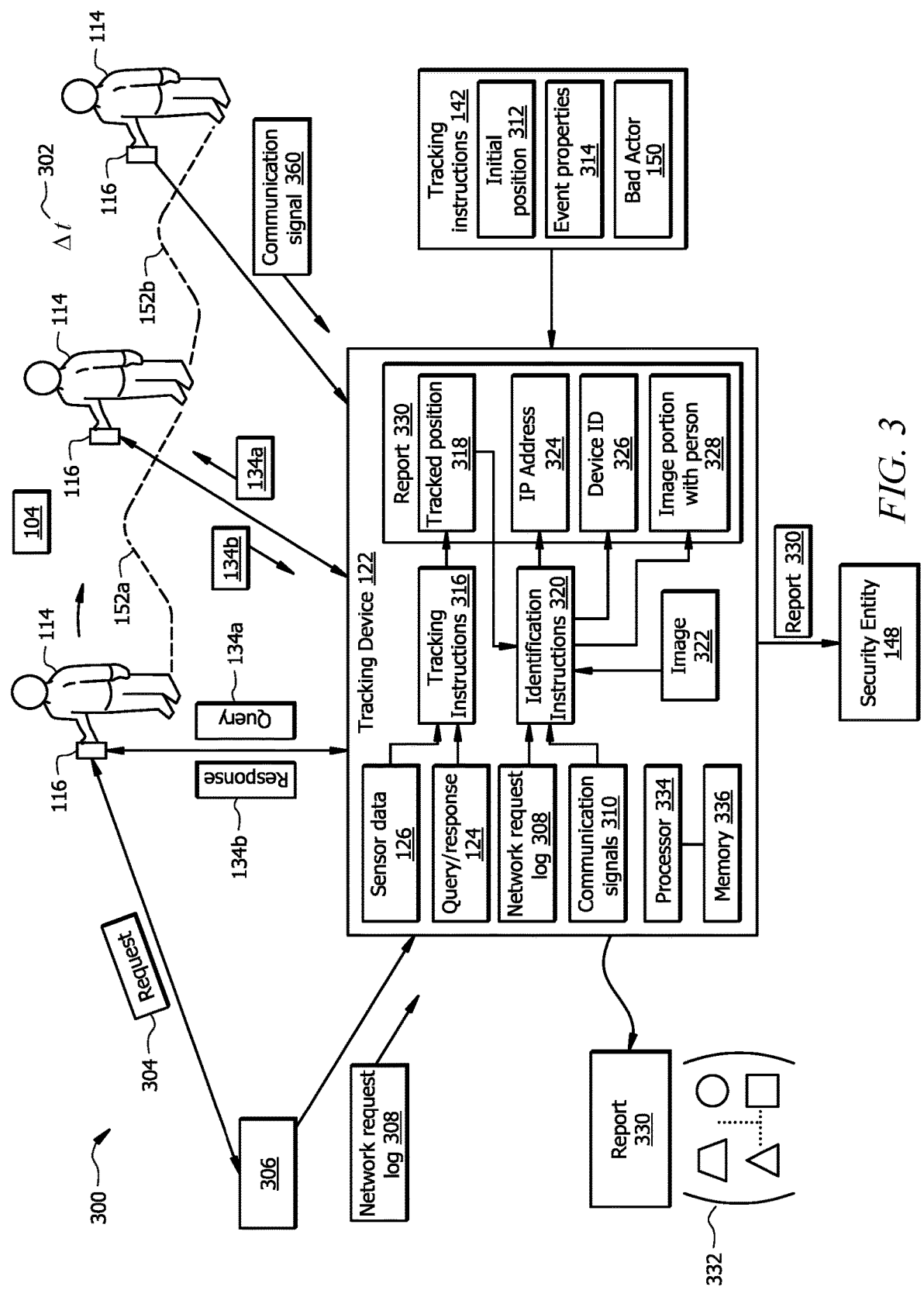
FIG. 3 is a flow diagram illustrating operation of the automated tracking device of the system of FIG. 1.

FIG. 3 is a flow diagram 300 illustrating operation of an example tracking device 122 of FIG. 1 in greater detail. As described above, the tracking device 122 aids in identifying and/or tracking a potential bad actor 150 (e.g., detected by the automated response subsystem 124, described above). The tracking device 122 may receive tracking instructions 142, which cause the tracking device 122 to begin performing functions to identify and/or track a bad actor 150. As described above, in some embodiments, one or more functions of the automated response subsystem 124 are performed by the tracking device 122. For example, the tracking device 122 may perform at least the subset of functions of the automated response subsystem 124 to determine the tracking instructions 142.

The tracking device 122 includes a processor 334 and a memory 336. The memory 336 includes any logic, instructions, code, and/or rules for implementing the functions of the tracking device 122 using the processor 334. The processor 334 comprises one or more processors. The processor 334 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 334 may be a programmable logic device, a microcontroller, a microprocessor, or any suitable combination of the preceding. The processor 334 is communicatively coupled to and in signal communication with the memory 336. The one or more processors are configured to process data and may be implemented in hardware and/or software. For example, the processor 334 may be 8-bit, 16-bit, 32-bit, 64-bit or of any other suitable architecture. The processor 334 may include an arithmetic logic unit (ALU) for performing arithmetic and logic operations, processor registers that supply operands to the ALU and store the results of ALU operations, and a control unit that fetches instructions from memory 336 and executes them by directing the coordinated operations of the ALU, registers and other components. In an embodiment, the function of the tracking device 122 described herein is implemented using logic units, FPGAs, ASICs, DSPs, or any other suitable hardware or electronic circuitry.

The memory 336 is operable to store any data, instructions, logic, rules, or code operable to execute the functions of the tracking device 122. The memory 336 comprises one or more disks, tape drives, or solid-state drives, and may be used as an over-flow data storage device, to store programs when such programs are selected for execution, and to store instructions and data that are read during program execution. The memory 336 may be volatile or non-volatile and may comprise read-only memory (ROM), random-access memory (RAM), ternary content-addressable memory (TCAM), dynamic random-access memory (DRAM), and static random-access memory (SRAM).

After being received, the tracking instructions 142 may be stored in the memory 336 of the tracking system 122. The tracking instructions 142 include an indication of the bad actor 150, an initial position 312 of the bad actor 150, and event properties 314. For example, the tracking instructions 142 may identify person 114 as the bad actor 150. The initial position 312 is generally a location within the space 102 where the tracking device 122 should seek to locate the device 116 of the person 114 identified as the bad actor 150. For example, the initial position 312 may correspond to a position 152 of the person 114 at the time when the detected event 136 is determined. The event properties 314 include other characteristics of the detected event 136, such as the type of the detected event 136, other people 110, 118 in the space 102 that may be impacted by the bad actor 150 a and/or the detected event 136, and the like. The event properties 312 may include at least a portion of the feature values 128a-c and/or the event scores 132a-c determined by the automated response subsystem 124. The tracking device 122 may use the event properties 314 to aid in identifying and/or tracking the bad actor 150 and generating an appropriate report 330 for providing further response to the detected event 136, as described further below.

The tracking device 122 detects the device 116 operated by the person 114 identified as the bad actor 150. For example, the tracking device 122 may detect a network-access request 304 from the device 116 to access a local network. For example, the device 116 operated by the person 114 identified as the bad actor 150 may be configured to automatically send a request 304 to a networking device 306. The networking device 306 may be a wireless network router. The networking device 306 may be implemented using the processor, memory, and interface of the device 800 described with respect to FIG. 8 below. The tracking device 122 may monitor such requests 304, for example, by continuously or intermittently obtaining and reviewing a network request log 308 from the networking device 306. The tracking device 122 may detect the device 116 (e.g., such that query/response communications 134 can be sent and received) based on the network request log 308. For example, the tracking device 122 may detect a device 116 requesting access to the networking device 306 at the initial position 312 provided in the tracking instructions 142. As described further below, the tracking device 122 may use the network request log 308 to determine identifying information from the device 116, such as the IP address 324 of the device 116 and/or a device or user identifier 326 associated with the device 116. This information may aid in identifying (e.g., by name) the person 114 identified as the bad actor 150, thereby improving the security technology used to track and identify bad actors 150.

In some embodiments, the tracking device 122 detects the device 116 of the person 114 identified as the bad actor 150 based on one or more other communication signals 310 output by the device 116. For example, the device may output a signal 310 corresponding to an NFC communication signal, a Bluetooth signal, and/or any other type of wireless communication signal. As an example, the tracking device 122 may detect device 116 if the communication signal 310 is received from a location corresponding to the initial position 312 provided in the tracking instructions 142. As described further below, the communication signal 310 may include identifying information of the device 116 and/or person 114, such as a device identifier 326, which can be included in report 330 to more effectively respond to the detected event 136 and/or identify the bad actor 150.

The tracking device 122 may implement tracking instructions 316 (e.g., stored in the memory 336) to determine a tracked position 318 corresponding to the physical location 152 of the person 114 identified as the bad actor 150 over time in the space 102 and/or identification instructions 320 to determine additional information which may be useful for further identifying the person 114 believed to be the bad actor 150. The tracking instructions 316 and/or identification instructions 320 may be stored in the memory 336 and implemented using the processor 334 of the tracking device 122.

The tracking instructions 316, when implemented by the processor 334, may use sensor data 126 and/or query/response communications 134 determine the tracked position 318 of the person 114 in the space 102. The tracked position 318 corresponds to the physical position or location 152 of the person 114 in the space 102 over time. For example, once the device 116 is detected, the tracking device 122 may use query/response communications 134 to track the position 152 of the device 116 in the space 102. For instance, over a period of time 302, the tracking device 122 may send queries 134a to the device 116 and receive corresponding responses 134b from the device 116. The tracking instructions 316 are used to determine, based on the sent queries 134a and the received responses 134b from the device 116, positions 152 of the device 116 within the space 102 over the period of time 302. For example, during a first portion of the period of time 302, the tracking instructions 316 may be used to determine tracked positions 318 corresponding to positions 152a illustrated for the movement of person 114 in FIG. 3. Subsequently, during a second portion of the period of time 302, the tracking instructions 316 may be used to determine tracked positions 318 corresponding to positions 152b illustrated for the further movement of person 114. This process may be repeated until the person 114 exits the space 102.

The identification instructions 320, when executed, cause the processor 334 to determine further identifying information for the person 114 identified as the bad actor 150 and/or the device 116 operated by this person 114. For example, as described briefly above, the identification instructions 320 may cause the processor 334 to use the network request log 308 and/or other device communication signals 310 to determine the IP address 324 of the device 116 and/or a device or user identifier 326 associated with the device 116. For example, the network request log 308 may include an entry that indicates the IP address 324 of the device 116 requesting network access. Similarly, a communication signal 310 may include an identifier 326 of the device 116 sending the signal 310. This information may be included in the report 330, described further below.

The identification instructions 320, when executed, may further cause the processor 334 to obtain an image 328 of the person 114 identified as the bad actor 150. For example, the tracking device 122 may receive an image 322 of at least a portion of the space 102. For example, image 322 may be received from one of the sensors 104 located in space 102, where the sensor 104 is a camera. The identification instructions 320 may be used to determine a portion 328 of the image 322 that includes person 114. For example, the identification instructions 320 may be used to determine an image portion 328 that corresponds to an area around the initial position 312 and/or the physical position 152 of the person 114 in the space 102 at the time the image 322 was recorded. The image portion 328 that includes person 114 may be included in the report 330, as described further below.

The tracking device 122 generates a report 330 that includes collected information about the person 114 determined to the bad actor 150. The report 330 generally includes the tracked position 318 of the person 114 and/or any other identifying information determined using the identification instructions 320, such as the IP address 324 of the device 116, the device identifier 326 of device 116, the image 328 of person 114, and the like. The report 330 may be provided to the security entity 148, described with respect to FIG. 1 above. For instance, based on the event properties 314, the tracking device 122 may determine whether the detected event 136 satisfies criteria 138 for providing the report 330 to the security entity 148. For instance, if the event properties 318 indicate that there was greater than a threshold probability (e.g., a threshold 826 of FIG. 8) that the bad actor 150 engaged in a security-compromising event 136, the report 330 may be automatically provided to the security entity 148. In some embodiments, the report 330 may be provided to the security entity 148 in coordination with the alert 140 provided by the automated response subsystem 124, such that the security entity 148 has quick access to the report 330 when responding to the detected event 136. This can allow the security entity 148 to have helpful information in accurately identifying the bad actor 150 when responding to the detected event 136. As such, automatic provision of report 330 to the security entity 148 provides an improvement to security technology by providing increased information to the security entity 148, such that an appropriate level and type of response is provided.

In some embodiments, the tracking device 122 associated with space 102 is in communication with a collection of tracking devices 332 located in remote locations. For example, the other tracking devices 332 may be located in other locations to perform substantially the same operations described for tracking device 122 in order to track people in different spaces. Each remote tracking device 332 may be configured the same as the tracking device 122 (e.g., with a corresponding processor 334 and memory 336 as described above). Tracking device 122 may provide the report 330 to the other tracking devices 332, such that the person 114 identified as the bad actor 150 can be detected in the other spaces monitored by devices 332. For example, the other tracking devices 332 may use the report 330 to detect the presence of the device 116 operated by person 114 in the various remote locations monitored by tracking devices 332. This facilitates the tracking of the person 114 identified as the bad actor 150 across multiple locations, thereby further improving security-related technology used for tracking potential bad actors 150.

Figure 4:
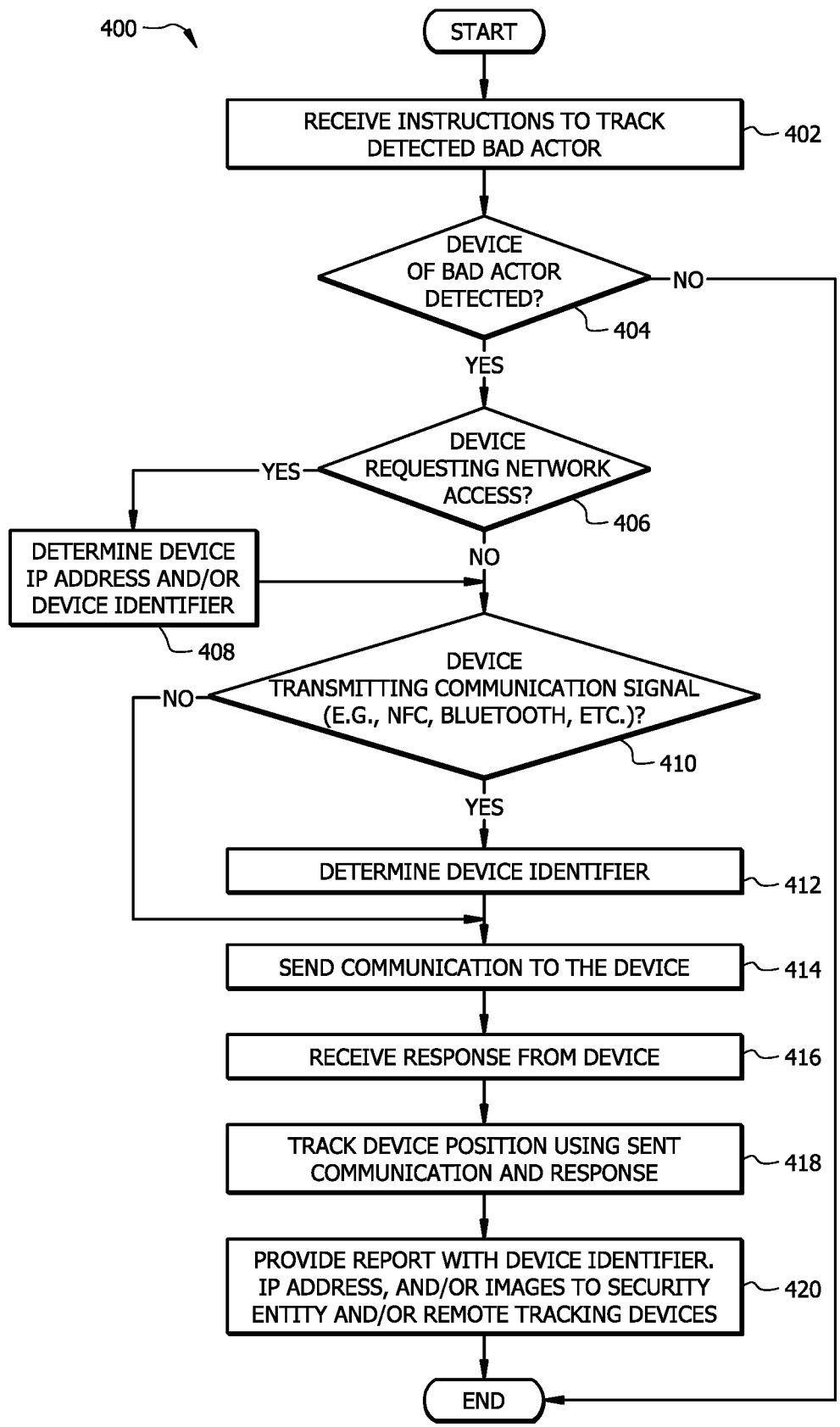
FIG. 4 is a flowchart illustrating an example method of operating the automated tracking device of the system of FIG. 1.

FIG. 4 is a flowchart of an example method 400 for operating the tracking device 122 of FIGS. 1 and 3. The method 400 generally facilitates improved identification and tracking of a potential bad actor 150. Method 400 may begin at step 402 where tracking instructions 142 are received by the tracking device 122. As described above, the tracking instructions 142 include an indication of the bad actor 150, an initial position 312 of the bad actor and event properties 314. For example, the tracking instructions 142 may identify person 114 as the bad actor 150. The initial position 312 is generally a location within the space 102 where the tracking device 122 should seek to locate the device 116 of the person 114 identified as the bad actor 150. For example, the initial position 312 may correspond to a position 152 of the person 114 at the time when the detected event 136 is determined. The event properties 314 include other characteristics of the detected event 136, such as the type of the detected event 136, other people 110, 118 in the space 102 that may be impacted by the bad actor 150 and/or the detected event 136, and the like. In some embodiments, the tracking device 122 may perform at least a portion of the functions of the automated response subsystem 124. For instance, the tracking device 122 may perform at least the set of functions used to determine the tracking instructions 142, as described with respect to FIGS. 1 and 2 above. As such, the method 400 of FIG. 4 may incorporate one or more steps from the method 200 of FIG. 2 described above.

At step 404, the tracking device 122 attempts to detect the device 116 of the person 114 identified as the bad actor 150 and determines whether the device 116 is successfully detected. As described above, the tracking device 122 may detect the device 116 using information from the tracking instructions 142. For example, the tracking device 122 may detect the device 116 that is sending a request 304 for network access and/or other communications 310 from the initial position 312 indicated in the tracking instructions 142. If the device 116 is not detected, method 400 ends. Otherwise, if the device 116 is detected, the tracking device 122 proceeds to step 406.

At step 406, the tracking device 122 determines if the detected device 116 is requesting access to a local network. For example, the tracking device 122 may determine whether the device 116 has sent or is sending a network-access request 304 to networking device 306 (e.g., using the network request log 308, described above). If the device 116 is or has requested network access, the tracking device 122 proceeds to step 408. At step 408, the tracking device 122 determines an IP address 324 and/or a device identifier 326 for the device 116. For example, the tracking device 122 may identify this information in an entry of the network request log 308 that corresponds to the request 304 from the device 116. If, at step 406, no request 304 for network access is identified, the tracking device 122 proceeds to step 410.

At step 410, the tracking device 122 determines if any communication signal 310 is detected from the device 116. For example, the tracking device 122 may determine whether the device 116 of the person 114 identified as the bad actor 150 is sending an NFC communication signal, a Bluetooth signal, or the like. If the device 116 is transmitting a communication signal 310, the tracking device 122 proceeds to step 412. At step 412, the tracking device 122 determines a device identifier 326 for the device 116 and/or any other information which can be obtained from the communication signal 310. For example, the tracking device 122 may determine and record (e.g., in the report 330—see step 420) the type of communication signal 310 sent by the device 116. This information may be helpful for tracking the device 116 and/or re-identifying the device 116 and/or the person 114 operating the device 116 at a later time and/or in another location. If, at step 410, no communication signal 310 is detected, the tracking device 122 proceeds to step 414.

At steps 414-418, the tracking device uses query/response communications 134 to track the physical location 152 of the device 116 in the space in order to determine the tracked position 318 of the person 114 identified as the bad actor 150. In order to facilitate the query/response communication 134, the tracking device 122 may allow the device 116 to connect to the local network, such that communication is facilitated via the local network (e.g., using networking device 306 of FIG. 3 as an intermediary if necessary). If the device 116 is sending communication signal 310, the query/response communications 134 may be achieved using the same communication type as the communication signal 310 (e.g., NFC, Bluetooth, or the like). Generally, any appropriate approach may be employed to facilitate communication 134 between the tracking device 122 and the device 116 of the person 114 identified as the bad actor 150.

At step 414, the tracking device 122 sends a query 134a. As described above, the query 134a may be sent via a local network or via any form of wireless communication (e.g., the same or different than that used by the device 116 to transmit communication signal 310). The query 134a may be configured to cause the device 116 to automatically provide a response 134b. At step 416, the tracking device 122 receives a response 134b to the query 134a. Steps 414 and 416 may be repeated to obtain a series of queries 134a and corresponding responses 134b.

At step 418, the tracking device 122 determines a tracked position 318 of the device 116 based on properties of the query/response communications 134 from steps 414 and 416. For example, the time intervals and/or directionality of query/response communications 134 over time may be used to track the person 114 in the space 102 using any appropriate tracking method. In some embodiments, the determination of the tracked position 118 may be supplemented using sensor data 126. For instance, sensor data 126 recorded from particular regions of the space 102 may be associated with the person 114 and/or the device 116.

At step 420, the tracking device 122 generates and provides a report 330 that includes the tracked position from step 418 and/or any other identifying information, such as an IP address 324 and/or device identifier 326 from steps 408 and/or 412. In some embodiments, the report 330 may further include an image 328 of the person 114 identified as the bad actor 150, as described with respect to FIG. 3 above.

The report 330 may be provided to the security entity 148 and/or to remote tracking devices 332, as described above with respect to FIG. 3.

Example Operation of an Adaptive-Security Device

Figure 5:
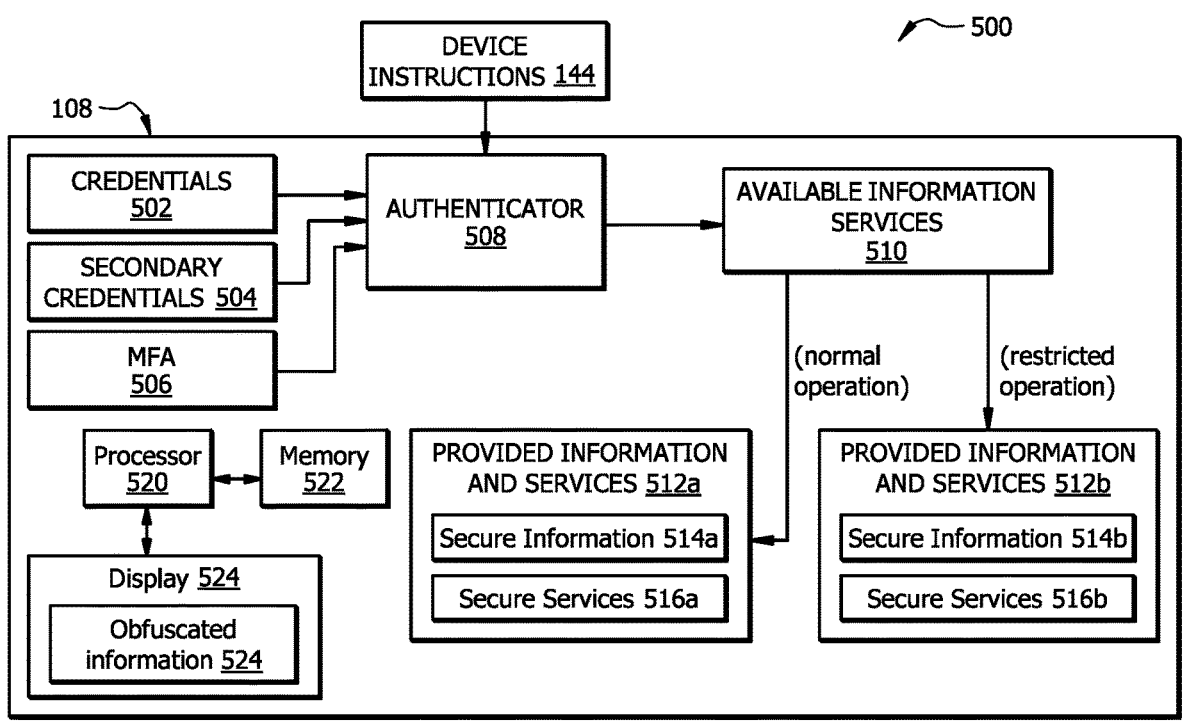
FIG. 5 is a flow diagram illustrating operation of the adaptive-security device of the system of FIG. 1.

FIG. 5 is a flow diagram 500 illustrating operation of the adaptive-security device 108 of FIG. 1 in greater detail. As described above, the adaptive-security device 108 is generally any device (e.g., an ATM, information terminal, or the like) that is configured to provide services and/or information 510 and is configured to adjust its security protocols for improved data security in response to a detected event 136. When an event 136 is detected that may compromise security of the adaptive-security device 108, device operation instructions 144 may be provided to the adaptive-security device 108 that identify security protocols to improve security of the adaptive-security device 108. The adaptive-security device 108 then adjusts authentication protocols and/or the portion 512a,b of the information and services 510 that are available for access through the adaptive-security device 108 (e.g., by following the "normal operation" or "restricted operation" flow of FIG. 5). As described above, in some embodiments, one or more functions of the automated response subsystem 124 are performed by the adaptive-security device 108. For example, the adaptive-security device 108 may perform at least the subset of functions of the automated response subsystem 124 to determine the device operation instructions 144.

The adaptive-security device 108 includes a processor 520, memory 522, and display 524. The memory 336 includes any logic, instructions, code, and/or rules for implementing the functions of the adaptive-security device 108 using the processor 520. The processor 520 comprises one or more processors. The processor 520 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 520 may be a programmable logic device, a microcontroller, a microprocessor, or any suitable combination of the preceding. The processor 520 is communicatively coupled to and in signal communication with the memory 522. The one or more processors are configured to process data and may be implemented in hardware and/or software. For example, the processor 520 may be 8-bit, 16-bit, 32-bit, 64-bit or of any other suitable architecture. The processor 520 may include an arithmetic logic unit (ALU) for performing arithmetic and logic operations, processor registers that supply operands to the ALU and store the results of ALU operations, and a control unit that fetches instructions from memory 522 and executes them by directing the coordinated operations of the ALU, registers and other components. In an embodiment, the function of the adaptive-security device 108 described herein is implemented using logic units, FPGAs, ASICs, DSPs, or any other suitable hardware or electronic circuitry.

The memory 522 is operable to store any data, instructions, logic, rules, or code operable to execute the functions of the adaptive-security device 108. The memory 522 comprises one or more disks, tape drives, or solid-state drives, and may be used as an over-flow data storage device, to store programs when such programs are selected for execution, and to store instructions and data that are read during program execution. The memory 522 may be volatile or non-volatile and may comprise read-only memory (ROM), random-access memory (RAM), ternary content-addressable memory (TCAM), dynamic random-access memory (DRAM), and static random-access memory (SRAM).

The display 524 is generally any appropriate graphical display such as a monitor, touchscreen, or the like. The display 524 may be operable to display an alert 140 and/or obfuscated information 526, as described further below.

As illustrated in FIG. 5, the adaptive-security device 108 is generally configured to provide certain available information and services 510. In the example case where the adaptive-security device 108 is an ATM machine, the ATM device 108 may provide account balance information and cash withdrawal services. The example adaptive-security device 108 of FIG. 5 includes an authenticator 508 that is operable to determine whether a user (e.g., person 110 of FIG. 1) can access all or a portion of the available information and services 510. For example, during normal operation (e.g., before device operation instructions 144 are received), the adaptive-security device 108 may receive user credentials 502 (e.g., from a person 110 interacting with the adaptive-security device 108) and determine whether the credentials 502 are valid/authenticated. For example, if the adaptive-security device 108 is an ATM machine, the credentials 502 may be a PIN number.

If the credentials 502 are validated, the user (e.g., person 110 of FIG. 1) is authenticated to access standard information and services 512a, according to the "normal operation" flow of FIG. 5. Generally, the authenticator 508 may determine the portion of all available information and services 510 that are included in the standard provided information and services 512a (e.g., based on access privileges of a given user). During normal operation (e.g., before receiving device operation instructions 144), a user will generally have access to all appropriate information and services 510 for the user, such that the provided information and services 512a include secure information 514a and secure services 516a. For the example of an ATM device 108, secure information 514a may include account balances, transaction histories, account numbers, and the like. Still referring to this example, the secure services 516a may include the withdrawal of cash from the ATM device 108.

When the adaptive-security device 108 receives device operation instructions 144, the adaptive-security device 108 may adjust the portion of the available information and services 510 available and/or the authentication requirements for accessing information and/or services 510. For example, if a user is not already accessing secure information 514a when the device operation instructions 144 are received, the authenticator 508 may be adjusted to increase authentication requirements for accessing the secure information 514a and/or secure service 516a. For example, the adaptive-security device 108 may increase authentication requirements of the authenticator 508 by requiring multi-factor authentication (MFA) 506 and/or or secondary authentication credentials 504. Secondary credentials 504 may include an answer to a predefined security question, a password (e.g., in addition to the standard credentials 502, which may, for example, be a PIN number for an ATM device 108), or the like. Multi-factor authentication 506 involves entry of a credential provided to the device (e.g., device 112 of person 110 of FIG. 1) of the user.

After device operation instructions 144 are received, the adaptive-security device 108 may begin operating according to the "restricted operation" flow of FIG. 5 by stopping or preventing display of at least a portion of the secure information 514a and secure services 516a, such that only reduced information 512b is displayed and reduced services 516b are available. For the example of an ATM device 108, the reduced information 514b may exclude account balances, account numbers, and the like, and reduced services 516b may reduce the amount of cash available from the ATM device 108 or prevent withdrawals of cash altogether.

If the user is currently accessing the secure information 514a or otherwise already authenticated by the adaptive-security device 108, the adaptive-security device 108 may prevent access to at least a portion of services 510 provided by the adaptive-security device 108 (e.g., without necessarily preventing the user from continuing to use the adaptive-security device 108). For the example of an ATM device 108, the secure service 516a of cash withdrawal may be prevented or limited, such that the security of this service 516a is improved. As another example, if the user is already accessing the secure information 514a when the device operation instructions 14 are received, the adaptive-security device 108 may prevent display of at least a portion of the secure information 514a by obfuscating at least a portion of the secure information 514a, such that only reduced information 514b is available for viewing. As an example, the adaptive-security device 108 may present obfuscated information 526 on the display 524.

In some cases, the operation instructions 144 may provide an indication of whether a high level of response is needed (e.g., if there is a high probability of a security-comprising event 136, as described with respect to FIG. 1 above). If this is the case, the adaptive-security device 108 may stop operating to provide information and services 510 altogether, such that no user can be authenticated to access secure information 514a and/or secure services 516a. This mitigates any chance for compromise of the secure information 514a and/or secure services 516a during such an event 136.

Figure 6:
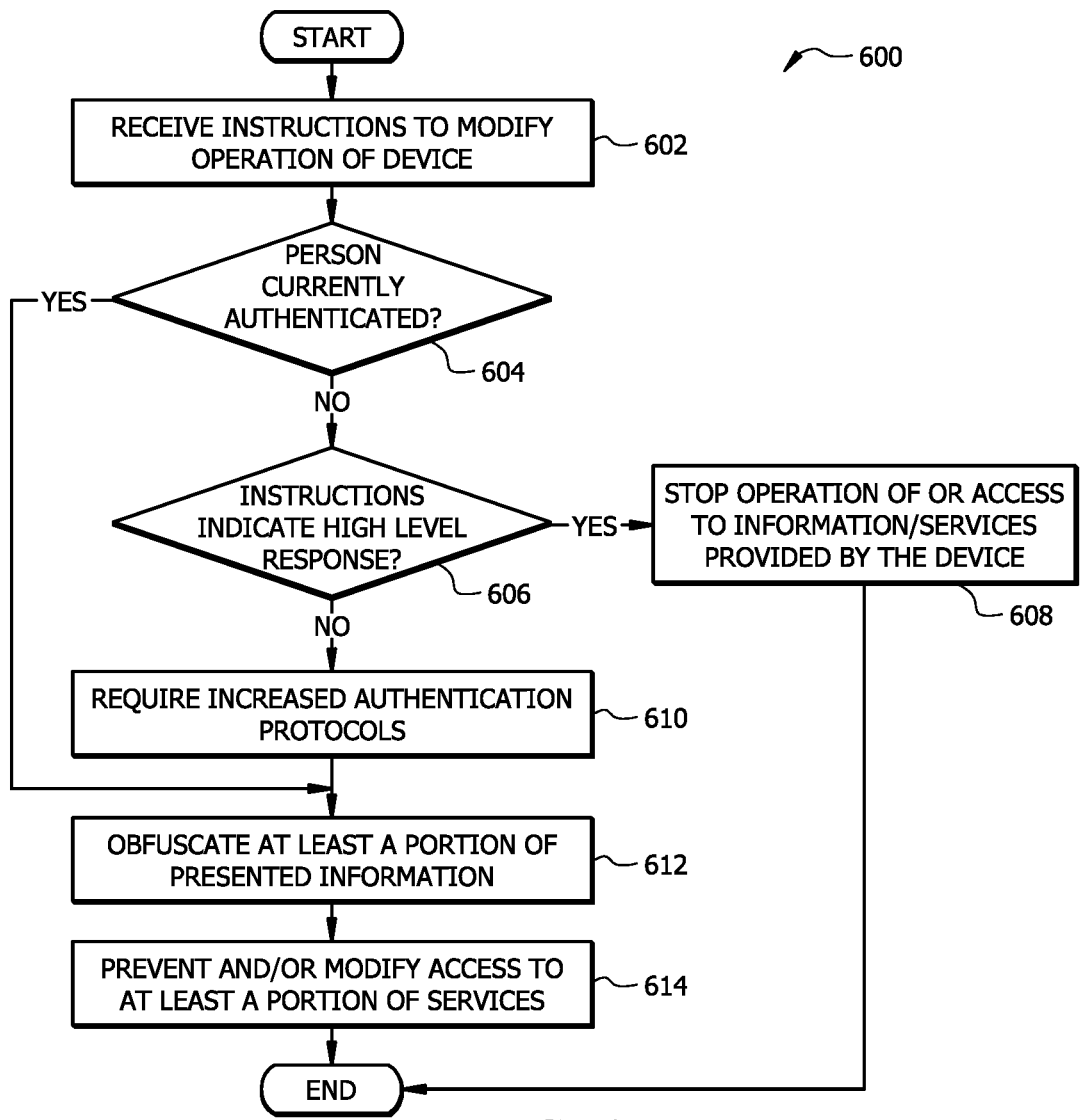
FIG. 6 is a flowchart illustrating an example method of operating the adaptive-security device of the system of FIG. 1.

FIG. 6 is a flowchart of an example method 600 for operating the adaptive-security device 108 of FIGS. 1 and 5. The method 600 generally facilitates more secure operation of the adaptive-security device 108 to provide information and services 510, particularly when a security-compromising event 136 is detected. Method 600 may begin at step 602 where device operation instructions 144 are received by the adaptive-security device 108. As described above, the device operation instructions 144 include instructions for operating the adaptive-security device 108 according to more stringent security protocols. In some embodiments, the adaptive-security device 108 may perform at least a portion of the functions of the automated response subsystem 124. For instance, the adaptive-security device 108 may perform at least the set of functions used to determine the device operation instructions 144, as described with respect to FIGS. 1 and 2 above. As such, the method 600 of FIG. 6 may incorporate one or more steps from the method 200 of FIG. 2 described above.

At step 604, the adaptive-security device 108 determines whether a user is already authenticated and using the adaptive-security device 108. If a user is not already authenticated, the adaptive-security device 108 may use steps 606-610 to adjust authentication requirements for accessing the information and services 510 available through the device 108. For example, at step 606, the adaptive-security device 108 may determine whether a high-level response is indicated by the device operation instructions 144 (see step 230 of FIG. 2). If a high level response is indicated, the adaptive-security device 108 proceeds to step 608 and prevents use of the adaptive-security device 108 (e.g., at least until the detected event 136 has ended). For example, the adaptive-security device 108 may no longer allow anyone to access any information and/or services 510 through the device 108. The method 600 may then end. Generally, this approach is only taken for high-level security-compromising events 136, because it prevents the adaptive-security device 108 from being used for a period of time.

If the high level response is not indicted at step 606, the adaptive-security device 108 may proceed instead to step 610. At step 610, the adaptive-security device 108 adjusts operation of the authenticator 508 to increase authentication requirements for accessing the secure information 514a and/or secure service 516a. For example, the adaptive-security device 108 may increase authentication requirements of the authenticator 508 by requiring multifactor authentication (MFA) 506 and/or or secondary authentication credentials 504. Secondary credentials 504 may include an answer to a predefined security question, a password (e.g., in addition to the standard credentials 502, which may, for example, be a PIN number for an ATM device 108), or the like. Multi-factor authentication 506 involves entry of a credential provided to the device (e.g., device 112 of person 110 of FIG. 1) of the user.

At step 612, the adaptive-security device 108 may obfuscate at least a portion of the secured information 514a, such that only reduced information 514b is visible at the adaptive-security device 108. For instance, referring to the example of FIG. 5, the display 524 may present obfuscated information 526 in place of, or overlayed over, secure information 514a. For the example of an ATM device 108, the obfuscated information 526 may include an obfuscated account balance, an obfuscated account number, and the like, such that this secure information 514a cannot be viewed.

At step 614, the adaptive-security device 108 prevents and/or modifies access to the secure services 516a, such that only reduced services 516b are provided. The reduced services 516b may include a portion or none of the services 510 available through the adaptive-security device 108. For the example of an ATM device 108, the reduced services 516b may include a deposit of funds, while the secured services 516a of a cash withdrawal and/or generation of an account balance report are prevented.

Example Sensor of the Event Detection and Response System

Figure 7:
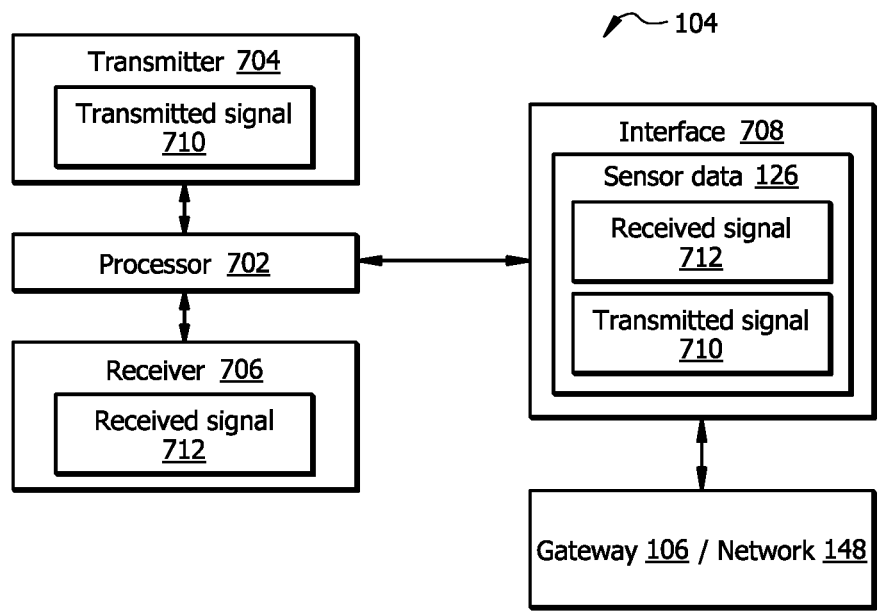
FIG. 7 is a schematic diagram of an example sensor of the system of FIG. 1.

FIG. 7 is an example sensor 104 of the system 100 illustrated in FIG. 1. The example sensor 104 includes a processor 702, a transmitter 704, a receiver 706, and a communications interface 706. The sensor 104 may be configured as shown or in any other suitable configuration. The sensor 104 may include more or fewer components depending on the type of the sensor 104. For example, a sensor 104 that is a camera may not include a transmitter 704. In some cases, a sensor 104 may include a memory (e.g., memory 804 of FIG. 8) coupled to the processor 702.

The processor 702 comprises one or more processors. The processor 702 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 702 may be a programmable logic device, a microcontroller, a microprocessor, or any suitable combination of the preceding. The processor 702 is communicatively coupled to and in signal communication with the transmitter 704, receiver 706, and interface 708. The one or more processors are configured to process data and may be implemented in hardware or software. For example, the processor 702 may be 8-bit, 16-bit, 32-bit, 64-bit or of any other suitable architecture. The processor 702 may include an arithmetic logic unit (ALU) for performing arithmetic and logic operations, processor registers that supply operands to the ALU and store the results of ALU operations, and a control unit that fetches instructions from a memory (e.g., memory 804 of FIG. 8) and executes them by directing the coordinated operations of the ALU, registers and other components. The one or more processors are configured to implement various instructions (e.g., for processing transmitted signals 710 and received signals 712 and providing sensor data 126 via the interface 708. In an embodiment, the function of the sensors 104 described herein is implemented using logic units, FPGAs, ASICs, DSPs, or any other suitable hardware or electronic circuitry.

The transmitter 704 is any component operable to generate a transmitted signal 710. For example, the transmitter 704 may be a radio transmitter, a sound transmitter, an ultrasonic transmitter, a light source, a laser, or the like. The transmitted signal 710 may be a radio signal, a sound (e.g., at an audible or inaudible frequency), an ultrasonic signal, a transmitted light, or any other appropriate signal type for observing properties of people 110, 114, 118 in the space 102. Properties of the transmitted signal 710 (e.g., frequency, magnitude, wavelength, etc.) of the transmitted signal 710 may be predefined for the transmitter 704 and/or may be indicated by the processor 702. In certain embodiments, the transmitter 704 is a radio transmitter and the transmitted signal 710 is a radio signal.

The receiver 706 is any component operable to receive a received signal 712. For example, the receiver 706 may be a radio receiver, a sound sensor, an ultrasonic sensor, a light sensor, a depth sensor, a camera (e.g., visible and/or infrared), or the like. The received signal 712 may be a radio signal, a sound, an image (e.g., a visible image, infrared image, depth image, etc.), or the like. For example, the received signal 712 may be a signal resulting from the transmitted signal 710 reflecting off of surface and/or people 110, 114, 118 in the space 102. Such reflected radio signals may be used to detect motion, a vital sign quantity, biometric characteristic, and other properties of people 110, 114, 118 in the space 102. In some embodiments, the received signal 712 is the image 322 described with respect to FIG. 3 above.

The communications interface 708 is configured to enable wired and/or wireless communications to the gateway 106 and/or the network 148 of FIG. 1. For example, the communications interface 708 may comprise a WIFI interface, a local area network (LAN) interface, a wide area network (WAN) interface, a modem, a switch, or a router. The processor 702 may send and receive data using the communications interface 708. The communications interface 708 may be configured to use any suitable type of communication protocol as would be appreciated by one of ordinary skill in the art.

Figure 8:
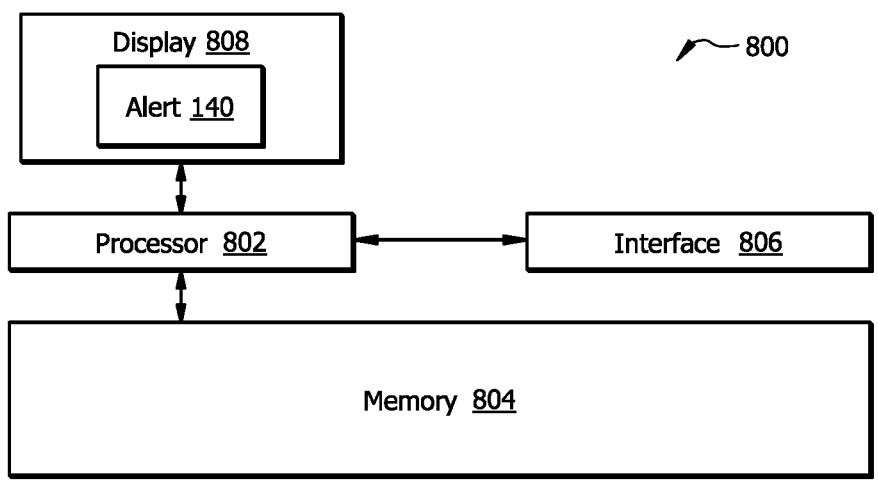
FIG. 8 is a diagram of an example device configured to implement certain components of the system of FIG. 1.

Example Device for Implementing Components of the Event Detection and Response System FIG. 8 is an embodiment of a device 800 configured to implement various components of the system 100. The device 800 includes a processor 802, a memory 804, a network interface 806, and a display 808. The device 800 may be configured as shown or in any other suitable configuration. The device 800 may be and/or may be used to implement the user devices 112, 116, 120, the gateway device 106, and a device at the security entity 146 of FIG. 1 as well as the networking device 306 of FIG. 3.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804, the network interface 806, and the display 810. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory 804 and executes them by directing the coordinated operations of the ALU, registers and other components. The one or more processors are configured to implement various instructions. For example, the one or more processors are configured to execute instructions to implement the function disclosed herein. In an embodiment, the function described herein is implemented using logic units, FPGAs, ASICs, DSPs, or any other suitable hardware or electronic circuitry.

The memory 804 is operable to store any data, instructions, logic, rules, or code operable to execute the functions of the user devices 112, 116, 120, the gateway device 106, a device at the security entity 146, and the networking device 306 described in this disclosure. The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The network interface 806 is configured to enable wired and/or wireless communications. The network interface 806 is configured to communicate data between the device 800 and other network devices, systems, or domain(s). For example, the network interface 806 may comprise a WIFI interface, a local area network (LAN) interface, a wide area network (WAN) interface, a modem, a switch, or a router. The processor 802 is configured to send and receive data using the network interface 806. The network interface 806 may be configured to use any suitable type of communication protocol as would be appreciated by one of ordinary skill in the art.

The display 808 is generally any appropriate graphical display such as a monitor, touchscreen, or the like. The display 808 may be operable to display an alert 140.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a plurality of sensors distributed about a space, wherein each sensor of the plurality of sensors is operable to generate sensor data associated with properties of one or more people in the space;
   an automated response subsystem comprising at least one processor configured to:
      receive the sensor data;
      determine one or more event scores based on feature values of the received sensor data, wherein each event score corresponds to a probability that an event type has occurred;
      detect an unauthorized activity performed by a first person in the space based on the one or more event scores; and
      in response to detecting the unauthorized activity, transmit tracking instructions identifying the first person associated with the unauthorized activity, event properties associated with the unauthorized activity, and a threshold probability that the first person has engaged in the unauthorized activity; and
   a tracking device comprising a processor configured to:
      receive the tracking instructions;
      detect a device associated with the first person;
      over a period of time, send queries to the device and receive corresponding responses from the device, wherein the queries are sent via a wireless network and the corresponding responses are automatically generated by the device in response to the queries;
      determine, based on the sent queries and the received responses from the device, positions of the device within the space over the period of time;
      generate a report comprising the determined positions of the device; and
      provide the report to a security entity when the threshold probability is met.

2. The system of claim 1, wherein the processor of the tracking device is further configured to:
   detect the device associated with the first person by detecting a network-access request to access a local network from the device;
   determine, based on the network-access request, an IP address of the device; and
   include the IP address in the report provided to the security entity.

3. The system of claim 1, wherein the processor of the tracking device is further configured to:
   detect the device associated with the first person by detecting a communication signal output from the device;
   determine, based on the communication signal, device identifier for the device; and
   include the device identifier in the report provided to the security entity.

4. The system of claim 1, wherein the communication signal comprises one or both of an NFC communication and a Bluetooth communication.

5. The system of claim 1, wherein the processor of the tracking device is further configured to:
   receive an image of at least a portion of the space;
   determine a portion of the image associated with the determined positions of the device; and
   include at least the portion of the image in the report provided to the security entity.

6. The system of claim 1, wherein the processor of the tracking device is further configured to provide the report to one or more remote tracking devices, wherein each of the one or more remote tracking devices is configured to use the report to detect a presence of the device in a corresponding remote location.

7. The system of claim 1, wherein the at least one processor of the automated response subsystem is further configured to detect the unauthorized activity based on one or more of a movement speed, presented height, and a biometric characteristic of the first person.

8. The system of claim 1, wherein the at least one processor of the automated response subsystem is further configured to detect the unauthorized activity based on one or more of a movement speed, presented height, and a biometric characteristic of another person who is interacting with the first person.

9. A method comprising:
   receiving sensor data generated by a plurality of sensors distributed about a space, wherein each sensor of the plurality of sensors is operable to generate the sensor data associated with properties of one or more people in the space;
   determining one or more event scores based on feature values of the received sensor data, wherein each event score corresponds to a probability an even type has occurred;
   detecting an unauthorized activity performed by a first person in the space based on the one or more event scores; and
   in response to detecting the unauthorized activity, generating tracking instructions identifying the first person associated with the unauthorized activity, event properties associated with the unauthorized activity, and a threshold probability that the first person has engaged in the unauthorized activity;
   detecting a device associated with the first person;
   over a period of time, sending queries to the device and receive corresponding responses from the device, wherein the queries are sent via a wireless network and the corresponding responses are automatically generated by the device in response to the queries;
   determining, based on the sent queries and the received responses from the device, positions of the device within the space over the period of time;

generating a report comprising the determined positions of the device; and providing the report to a security entity when the threshold probability is met.

10. The method of claim 9, further comprising:

detecting the device associated with the first person by detecting a network-access request to access a local network from the device;

determining, based on the network-access request, an IP address of the device; and including the IP address in the report provided to the security entity.

11. The method of claim 9, further comprising:

detecting the device associated with the first person by detecting a communication signal output from the device;

determining, based on the communication signal, device identifier for the device; and including the device identifier in the report provided to the security entity.

12. The method of claim 9, wherein the communication signal comprises one or both of an NFC communication and a Bluetooth communication.

13. The method of claim 9, further comprising:

receiving an image of at least a portion of the space;

determining a portion of the image associated with the determined positions of the device; and including at least the portion of the image in the report provided to the security entity.

14. The method of claim 9, further comprising providing the report to one or more remote tracking devices, wherein each of the one or more remote tracking devices is configured to use the report to detect a presence of the device in a corresponding remote location.

15. A tracking device, comprising:

a memory operable to store tracking instructions generated by an automated response subsystem, wherein the tracking instructions identify a first person in a space that is detected to have performed an unauthorized activity, event properties associated with the unauthorized activity, and a threshold probability that the first person has engaged in the unauthorized activity; and a processor communicatively coupled to the memory and configured to:

detect a device associated with the first person;

over a period of time, send queries to the device and receive corresponding responses from the device, wherein the queries are sent via a wireless network and the corresponding responses are automatically generated by the device in response to the queries;

determine, based on the sent queries and the received responses from the device, positions of the device within the space over the period of time;

generate a report comprising the determined positions of the device; and provide the report to a security entity when the threshold probability is met.

16. The tracking device of claim 15, wherein the processor is further configured to:

detect the device associated with the first person by detecting a network-access request to access a local network from the device;

determine, based on the network-access request, an IP address of the device; and include the IP address in the report provided to the security entity.

17. The tracking device of claim 15, wherein the processor is further configured to:

detect the device associated with the first person by detecting a communication signal output from the device;

determine, based on the communication signal, device identifier for the device; and include the device identifier in the report provided to the security entity.

18. The tracking device of claim 15, wherein the communication signal comprises one or both of an NFC communication and a Bluetooth communication.

19. The tracking device of claim 15, wherein the processor is further configured to:

receive an image of at least a portion of the space;

determine a portion of the image associated with the determined positions of the device; and include at least the portion of the image in the report provided to the security entity.

20. The tracking device of claim 15, wherein the processor is further configured to provide the report to one or more remote tracking devices, wherein each of the one or more remote tracking devices is configured to use the report to detect a presence of the device in a corresponding remote location.

* * * * *